(12) United States Patent
Shao et al.

(10) Patent No.: US 9,338,797 B2
(45) Date of Patent: May 10, 2016

(54) DATA TRANSMISSION METHOD, BASE STATION, AND USER EQUIPMENT

(71) Applicant: Huawei Technologies Co., Ltd., Shenzhen, Guangdong (CN)

(72) Inventors: Jiafeng Shao, Beijing (CN); Chuanfeng He, Beijing (CN)

(73) Assignee: Huawei Technologies Co., Ltd, Shenzhen (CK)

( * ) Notice: Subject to any disclaimer, the term of this patent is extended or adjusted under 35 U.S.C. 154(b) by 30 days.

(21) Appl. No.: 14/302,013

(22) Filed: Jun. 11, 2014

(65) Prior Publication Data

US 2014/0307668 A1 Oct. 16, 2014

Related U.S. Application Data

(63) Continuation of application No. PCT/CN2012/087224, filed on Dec. 22, 2012.

(30) Foreign Application Priority Data

Jan. 17, 2012 (CN) .......................... 2012 1 0013916
Mar. 26, 2012 (CN) .......................... 2012 1 0082567

(51) Int. Cl.
*H04W 74/08* (2009.01)
*H04W 52/58* (2009.01)
(Continued)

(52) U.S. Cl.
CPC .............. *H04W 74/08* (2013.01); *H04W 52/58* (2013.01); *H04W 52/146* (2013.01); *H04W 74/008* (2013.01)

(58) Field of Classification Search
CPC ... H04W 74/08; H04W 74/008; H04W 52/58; H04W 52/146
See application file for complete search history.

(56) References Cited

U.S. PATENT DOCUMENTS

2008/0049655 A1 2/2008 Lundby et al.
2009/0088175 A1* 4/2009 Pelletier ............ H04W 74/0866
455/450

(Continued)

FOREIGN PATENT DOCUMENTS

CN 101489284 A 7/2009
CN 101507134 A 8/2009
(Continued)

OTHER PUBLICATIONS

Ericsson, "TTI alignment between CELL_FACH UEs and CELL_DCH UEs", Oct. 10-14, 2011, 3GPP TSG RAN WG1 Meeting #66bis, R1-113428, pp. 1-6.*
"Introduction of Fractional DPCH," 3GPP TSG-RAN3 Meeting #46, Scottsdale, USA, R3-050185, Change Request 25.402, CR 46, 3rd Generation Partnership Project, Valbonne, France (Feb. 14-18, 2005).

(Continued)

*Primary Examiner* — Paul H Masur
(74) *Attorney, Agent, or Firm* — Leydig, Voit & Mayer, Ltd.

(57) ABSTRACT

Embodiments of the present invention provide a data transmission method. The method includes: obtaining a slot format of a F-DPCH used for a UE; receiving an ACK message that is sent by a base station on an AICH; determining an F-DPCH frame offset $\tau_{F\text{-}DPCH}$ of the UE and determining a transmission time interval $\tau_{a\text{-}m}$ according to a predefined rule, where the $\tau_{a\text{-}m}$ indicates a time interval between a starting boundary of an access slot when the UE receives the AICH and a time point when the UE starts uplink transmission; receiving an uplink power control command word TPC on the F-DPCH according to the slot format of the F-DPCH and the $\tau_{F\text{-}DPCH}$; and performing uplink transmission to the base station according to the $\tau_{a\text{-}m}$.

14 Claims, 6 Drawing Sheets

(51) Int. Cl.
*H04W 74/00* (2009.01)
*H04W 52/14* (2009.01)

(56) References Cited

U.S. PATENT DOCUMENTS

| | | | |
|---|---|---|---|
| 2009/0168750 A1 | 7/2009 | Pelletier et al. | |
| 2009/0181710 A1* | 7/2009 | Pani et al. | |
| 2012/0052855 A1* | 3/2012 | Soliman | H04W 56/0025 455/422.1 |
| 2012/0115496 A1* | 5/2012 | Soliman | H04W 56/0015 455/452.1 |
| 2012/0176951 A1* | 7/2012 | Pradas | H04W 74/006 370/312 |
| 2013/0142174 A1* | 6/2013 | Larsson | H04B 7/0434 370/335 |
| 2015/0249964 A1* | 9/2015 | Pelletier | H04W 52/50 370/329 |

FOREIGN PATENT DOCUMENTS

| | | |
|---|---|---|
| CN | 101911809 A | 12/2010 |
| EP | 2381732 A1 | 10/2011 |
| WO | WO 2008024880 A2 | 2/2008 |
| WO | WO 2009007887 A2 | 1/2009 |

OTHER PUBLICATIONS

"TTI alignment between CELL_FACH UEs and CELL_DCH UEs," 3GPP TSG-RAN WG1 Meeting #66bis, Zhuhai, China, R1-113058, 3$^{rd}$ Generation Partnership Project, Valbonne, France (Oct. 10-14, 2011).

"Further discussion on the design of TTI alignment between CELL_FACH UEs and CELL_FACH and CELL_DCH UEs," 3GPP TSG-RAN WG1 Meeting #67, San Francisco, USA, R1-114282, 3$^{rd}$ Generation Partnership Project, Valbonne, France (Nov. 14-18, 2011).

"3$^{rd}$ Generation Partnership Project; Technical Specification Group Radio Access Network; Physical channels and mapping of transport channels onto physical channels (FDD) (Release 11)," 3GPP TS 25.211, V11.0.0, pp. 1-60, 3$^{rd}$ Generation Partnership Project, Valbonne, France (Dec. 2011).

"3$^{rd}$ Generation Partnership Project; Technical Specification Group Radio Access Network; Physical layer procedures (FDD) (Release 11)," 3GPP TS 25.214, V11.0.0, pp. 1-106, 3$^{rd}$ Generation Partnership Project, Valbonne, France (Dec. 2011).

"3$^{rd}$ Generation Partnership Project; Technical Specification Group Radio Access Network; Radio Resource Control (RCC); Protocol specification (Release 11)," 3GPP TS 25.331, V11.0.0, pp. 1-1909, 3$^{rd}$ Generation Partnership Project, Valbonne, France (Dec. 2011).

* cited by examiner

US 9,338,797 B2

DATA TRANSMISSION METHOD, BASE STATION, AND USER EQUIPMENT

CROSS-REFERENCE TO RELATED APPLICATIONS

This application is a continuation of International Patent Application No. PCT/CN2012/087224, filed on Dec. 22, 2012, which claims priority to Chinese Patent Application No. 201210013916.1, filed on Jan. 17, 2012, and Chinese Patent Application No. 201210082567.9, filed on Mar. 26, 2012, all of which are hereby incorporated by reference in their entireties.

TECHNICAL FIELD

Embodiments of the present invention relate to the field of radio communications, and in particular, to a data transmission method, a base station, and a user equipment.

BACKGROUND

With rapid development of communications technologies, wideband code division multiple access (referred to as WCDMA), as one of mainstream technologies of third generation mobile communications systems, has been widely studied and applied on a global scale. At present, the WCDMA has multiple releases such as Release 99, and Release 4 to Release 11.

In the third generation partnership project (referred to as 3GPP) WCDMA R7 version, a feature of enhanced cell forward access channel state in frequency division duplex (Enhanced CELL_FACH state in FDD) is introduced, which is aimed at solving how to reduce a downlink signaling delay and overcome a limitation of a common transmission channel of Release 99. A high speed downlink shared control channel (referred to as HS-DSCH) in a cell forward access channel (CELL_FACH), cell paging channel (CELL_PCH), cell URAN (universal mobile telecommunication system (UMTS) radio network) registration area (CELL_URA) state is used, so that a shorter signaling delay and a higher downlink transmission rate are achieved.

In the 3GPP WCDMA Release R8 version, a CELL-FACH state is further enhanced by introducing a feature of Enhanced CELL_FACH state in FDD to implement transmission by using an enhanced uplink dedicated channel (referred to as E-DCH) in place of a physical random access channel (referred to as PRACH) of Release 99, so as to further optimize uplink signaling and a data delay.

In a current UMTS network, especially in a developed communications market, market penetration of smart phones becomes increasingly higher, the processing amount of network data increases rapidly, and currently the influence of smart phones on a network has already become an attention focus in the industry. Reducing a delay and improving transmission efficiency are a problem to be solved urgently. Therefore, the industry hopes to further enhance a CELL-FACH state, so as to enable a user equipment (referred to as UE) to reside in a CELL-FACH state for a long time to bear a relevant service.

A transmission time interval (referred to as TTI) alignment technology between a CELL_FACH user equipment and a cell dedicated channel (CELL_DCH) user equipment is a technical solution to enhancing CELL-FACH. The technology is first proposed in Synchronized E-DCH of the UMTS R8 version, and its main idea is to align data blocks in uplink subframes of a CELL_FACH user and a CELL_DCH user for transmission, which can reduce interference of the CELL_DCH user on the CELL_FACH user, thereby improving a cell throughput.

With a current TTI alignment solution, compatibility between user equipments of Release 8, Release 9, and Release 10 and a user equipment of Release 11 cannot be achieved. To achieve TTI alignment, a system needs to redefine a new resource configuration for the user equipment of Release 11. As a result, common resources of an existing common E-DCH are separately used, which greatly reduces a utilization ratio of the common resources.

SUMMARY

Embodiments of the present invention provide a data transmission method, which can enable a user equipment of Release 11 to use an existing common resource configuration to implement TTI alignment, thereby improving a utilization ratio of common resources at the same time when obtaining a performance gain brought by the TTI alignment.

In one aspect, a data transmission method is provided, and the method includes:

obtaining a slot format of a fractional dedicated physical channel (F-DPCH) used for a user equipment (UE);

receiving an acknowledgement (ACK) message that is sent by a base station on an acquisition indicator channel (AICH);

determining an F-DPCH frame offset $\tau_{F\text{-}DPCH}$ of the UE and determining a transmission time interval $\tau_{a\text{-}m}$ according to a predefined rule, where the $\tau_{a\text{-}m}$ indicates a time interval between a starting boundary of an access slot when the UE receives the AICH (referred to as AICH access slot) and a time point when the UE starts uplink transmission;

receiving an uplink power control command (TPC) word on the F-DPCH according to the slot format of the F-DPCH and the $\tau_{F\text{-}DPCH}$; and performing uplink transmission to the base station according to the $\tau_{a\text{-}m}$.

In another aspect, a data transmission method is provided, and the method includes:

obtaining a slot format of a fractional dedicated physical channel (F-DPCH) used for a user equipment (UE);

sending an acknowledgement (ACK) message to the UE on an acquisition indicator channel (AICH);

determining an F-DPCH frame offset $\tau_{F\text{-}DPCH}$ of the UE and determining a transmission time interval $\tau_{a\text{-}m}$ according to a predefined rule, where the $\tau_{a\text{-}m}$ indicates a time interval between a starting boundary of an access slot when the UE receives the AICH and a time point when the UE starts uplink transmission;

sending an uplink power control command (TPC) word to the UE on the F-DPCH according to the slot format of the F-DPCH and the $\tau_{F\text{-}DPCH}$; and receiving uplink transmission of the UE according to the $\tau_{a\text{-}m}$.

In another aspect, a user equipment is provided, and the user equipment includes:

an obtaining unit, configured to obtain a slot format of a fractional dedicated physical channel (F-DPCH) used for the user equipment (UE);

a receiving unit, configured to receive an acknowledgement (ACK) message that is sent by a base station on an acquisition indicator channel (AICH);

a processing unit, configured to determine an F-DPCH frame offset $\tau_{F\text{-}DPCH}$ of the UE and determining a transmission time interval $\tau_{a\text{-}m}$ according to a predefined rule, where the $\tau_{a\text{-}m}$ indicates a time interval between a starting boundary of an access slot when the UE receives the AICH and a time point when the UE starts uplink transmission; where the receiving unit is further configured to receive an uplink power control command (TPC) word on the F-DPCH according to the slot format of the F-DPCH and the $\tau_{F\text{-}DPCH}$; and a sending unit, configured to perform uplink transmission to the base station according to the $\tau_{a\text{-}m}$.

In another aspect, a base station is provided, and the base station includes:

an obtaining unit, configured to obtain a slot format of a fractional dedicated physical channel (F-DPCH) used for a user equipment (UE);

a sending unit, configured to send an acknowledgement (ACK) message to the UE on an acquisition indicator channel (AICH);

a processing unit, configured to determine an F-DPCH frame offset $\tau_{F\text{-}DPCH}$ of the UE and determining a transmission time interval $\tau_{a\text{-}m}$ according to a predefined rule, where the $\tau_{a\text{-}m}$ indicates a time interval between a starting boundary of an access slot when the UE receives the AICH and a time point when the UE starts uplink transmission; where the sending unit is further configured to send an uplink power control command (TPC) word to the UE on the F-DPCH according to the slot format of the F-DPCH and the $\tau_{F\text{-}DPCH}$; and a receiving unit, configured to receive uplink transmission of the UE according to the $\tau_{a\text{-}m}$.

According to the embodiments of the present invention, configured resources in the same common E-DCH resource pool can be scheduled for UEs of Release 8/9/10/11 at the same time, thereby improving a utilization ratio of resources at the same time when obtaining a performance gain of TTI alignment.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
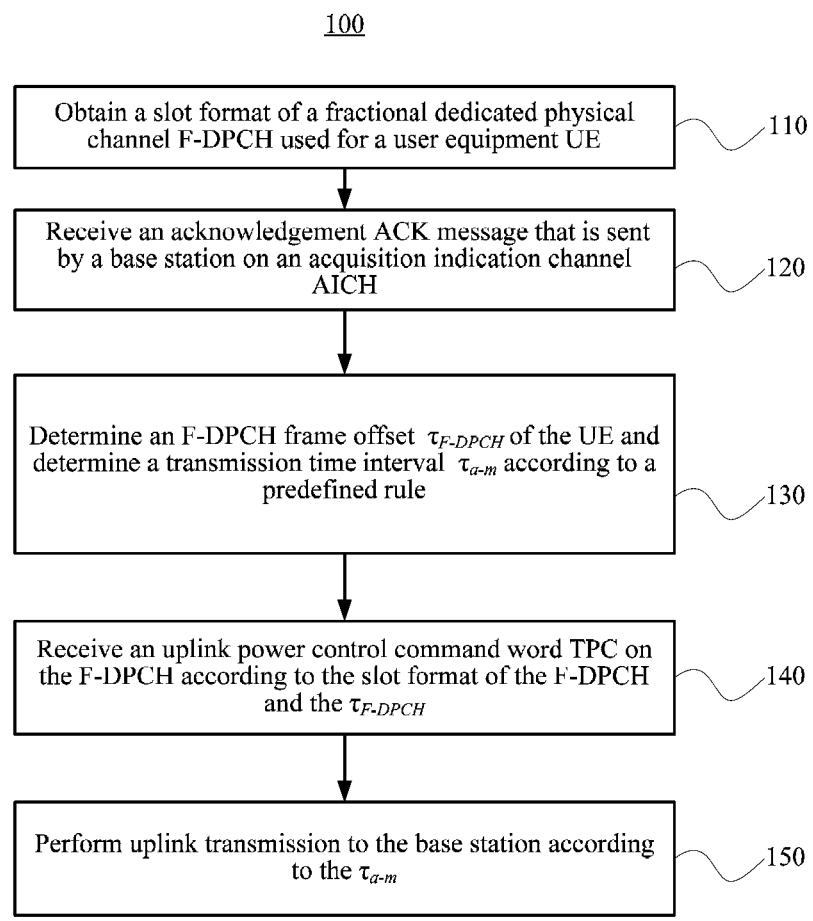
FIG. 1 is a schematic flow chart of a data transmission method according to an embodiment of the present invention.

FIG. 1 is a schematic flow chart of a data transmission method 100 according to an embodiment of the present invention. As shown in FIG. 1, the method 100 includes:

110: Obtain a slot format of a fractional dedicated physical channel F-DPCH used for a user equipment UE.

120: Receive an acknowledgement ACK message that is sent by a base station on an acquisition indicator channel AICH.

130: Determine an F-DPCH frame offset $\tau_{F\text{-}DPCH}$ of the UE and determine a transmission time interval $\tau_{a\text{-}m}$ according to a predefined rule, where the $\tau_{a\text{-}m}$ indicates a time interval between a starting boundary of an access slot when the UE receives the AICH (referred to as AICH access slot) and a time point when the UE starts uplink transmission.

140: Receive an uplink power control command word TPC on the F-DPCH according to the slot format of the F-DPCH and the $\tau_{F\text{-}DPCH}$.

150: Perform uplink transmission to the base station according to the $\tau_{a\text{-}m}$.

The method in the embodiment of the present invention is described in detail in the following with reference to specific examples.

After a UE enters a cell, the UE determines common resource configuration information of this cell through a system broadcast message broadcast on a broadcast channel by a base station (Node Base Station, referred to as Node B), where the common resource configuration information includes indication information of a fractional dedicated physical channel (referred to as F-DPCH) symbol offset $S_{offset}$.

To access the cell, the UE sends an access preamble to the NodeB. If the NodeB allows an uplink access request of the UE, the NodeB sends acknowledgement (ACK) information and an orthogonal sequence signature to the UE on an acquisition indicator channel (Acquisition Indication Channel, referred to as AICH). The orthogonal sequence signature herein is used for indicating a common resource configuration that is distributed by the NodeB to the UE for use. According to the embodiment of the present invention, the UE may determine a slot format of the F-DPCH of the UE according to an F-DPCH symbol offset $S_{offset}$ in the common resource configuration information distributed by the NodeB, and the UE no longer uses a predefined fixed slot format of the F-DPCH. Herein, different F-DPCH symbol offsets $S_{offset}$ in the common information distributed by the NodeB may be corresponding to index numbers of F-DPCH slot formats used by UEs respectively, so that a slot format of the F-DPCH used by the UE may be determined through $S_{offset}$; or different F-DPCH symbol offsets $S_{offset}$ in common information distributed by the NodeB may be corresponding to first bit offsets $N_{OFF1}$ of F-DPCHs used by the UE respectively, so that a slot format used by the UE may be determined according to $S_{offset}$; or different F-DPCH symbol offsets $S_{offset}$ in common information distributed by the NodeB may be corresponding to second bit offsets $N_{OFF2}$ of F-DPCHs used by the UE respectively, so that a slot format used by the UE may be determined according to $S_{offset}$. In this case, an F-DPCH symbol offset $S_{offset}$ used by the UE may be obtained through configuration or predefinition performed by a higher layer, for example, be set to a fixed value. In this way, different UEs do not use an F-DPCH symbol offset $S_{offset}$ configured in the common configuration information as an F-DPCH symbol offset $S_{offset}$ of the UEs, and therefore, when performing uplink transmission, different UEs may use the same F-DPCH symbol offset $S_{offset}$. Alternatively, according to the embodiment of the present invention, it may be configured or predefined by a higher layer, so that that a part of UEs use one F-DPCH symbol offset $S_{offset}$ and another part of UEs use another F-DPCH symbol offset $S_{offset}$.

For example, the UE may determine the slot format of the F-DPCH of the UE according to the F-DPCH symbol offset $S_{offset}$ in the common resource configuration information distributed by the NodeB, which specifically includes: When the F-DPCH symbol offset in the common information distributed by the NodeB to the UE, that is, $S_{offset}=i$, where i=an integer from 0 to 9, at this time, a slot format index number of the F-DPCH used by the UE, that is, slot format index= $S_{offset}$, thereby knowing the slot format of the F-DPCH used by the UE; or a first bit offset of the F-DPCH used by the UE, that is, $N_{OFF1}=[(S_{offset}+1)*2]$ mod 20, thereby knowing the slot format of the F-DPCH used by the UE; or a second bit offset of the F-DPCH used by the UE, that is, $N_{OFF2}=18-[(S_{offset}+1)*2]$ mod 20, thereby knowing the slot format of the F-DPCH used by the UE.

For example, the UE may determine the slot format of the F-DPCH of the UE according to the F-DPCH symbol offset $S_{offset}$ in the common resource configuration information distributed by the NodeB and an adjustment offset $n_{offset}$ configured or predefined by a higher layer, which specifically includes: When the F-DPCH symbol offset in the common information distributed by the NodeB to the UE, that is, $S_{offset}=i$, where i=an integer from 0 to 9, and the adjustment offset $n_{offset}$ configured or predefined by the higher layer is an integral multiple of 256 chips, at this time, a slot format index number of the F-DPCH used by the UE $$\text{slot format index} = \left[\left|S_{offset} - \frac{n_{offset}}{256}\right|\right] \mod 10,$$

thereby knowing the slot format of the F-DPCH used by the UE; or a first bit offset of the F-DPCH used by the UE $$N_{OFF1} = \left[\left(\left[\left|S_{offset} - \frac{n_{offset}}{256}\right|\right] \mod 10 + 1\right) * 2\right] \mod 20,$$

thereby knowing the slot format of the F-DPCH used by the UE; or a second bit offset of the F-DPCH used by the UE $$N_{OFF2} = 18 - \left[\left(\left[\left|S_{offset} - \frac{n_{offset}}{256}\right|\right] \mod 10 + 1\right) * 2\right] \mod 20,$$

thereby knowing the slot format of the F-DPCH used by the UE.

To avoid resource collision during resource allocation performed by a higher layer and enable different UEs to use the same F-DPCH symbol offset $S_{offset}$, for example, an F-DPCH symbol offset used by a UE of Release 11 may be $S_{offset}=i$, that is, the F-DPCH symbol offset used by the UE of Release 11 is zero.

According to the embodiment of the present invention, the UE may determine an F-DPCH frame offset $\tau_{F-DPCH}$ of the UE and determine a transmission time interval according to a predefined rule, where the $\tau_{a-m}$ indicates a time interval between a starting boundary of an access slot when the UE receives the AICH and a time point when the UE starts uplink transmission. For example, in a case that the NodeB receives, in an access slot3N, an access preamble sent by the UE, the UE determines the $\tau_{F-DPCH}$ and the $\tau_{a-m}$ according to the following formulas:

$$\tau_{F-DPCH}=(5120*S_{AI}+10240+n_{offset}) \mod 38400, \quad (1\text{-}1)$$

$$\tau_{a-m}=10240+\tau_0+n_{offset} \quad (1\text{-}2)$$

where the $S_{AI}$ indicates an AICH access slot number with an AI (AICH access slot # with the AI), which is sent by the NodeB and received by the UE, $\tau_0=1024$ chips, and $n_{offset}$ is an adjustment offset, which may be obtained through configuration or predefinition performed by a higher layer, for example, $n_{offset}=256*i$, $i=0\sim9$ or $n_{offset}$ is directly configured or defined as an integral multiple of 256 chips. Herein, the $\tau_{F-DPCH}$ and the $\tau_{a-m}$ are both in units of chips, which is the same in the following.

Alternatively, in a case that the NodeB receives, in an access slot3N+1, an access preamble sent by the UE, the UE determines the $\tau_{F-DPCH}$ and the $\tau_{a-m}$ according to the following formulas:

$$\tau_{F-DPCH}=(5120*S_{AI}+12800+n_{offset}) \mod 38400, \quad (2\text{-}1)$$

$$\tau_{a-m}=12800+\tau_0+n_{offset} \quad (2\text{-}2)$$

Alternatively, in a case that the NodeB receives, in an access slot 3N+2, an access preamble sent by the UE, the UE determines the $\tau_{F-DPCH}$ and the $\tau_{a-m}$ according to the following formulas:

$$\tau_{F-DPCH}=(5120*S_{AI}+15360+n_{offset}) \mod 38400$$

$$\tau_{a-m}=15360+\tau_0+n_{offset},$$

where the $\tau_0$ and the $n_{offset}$ have the same meanings as those described in the foregoing.

Then, after receiving the ACK that is sent by the NodeB on the AICH, the UE starts timing from the starting boundary of the AICH access slot, and after delaying $\tau_{a-m}$, the UE starts to perform uplink transmission to the NodeB. Herein, content of the uplink transmission may include channels such as a DPCCH, an E-DCH, an E-DCH absolute grant channel (referred to as E-AGCH), an E-DCH relative grant channel (referred to as E-RGCH), and an E-DCH hybrid automatic retransmission request indication channel (referred to as E-HICH). After the uplink transmission is ended, it may be considered that this random access process is ended.

Figure 2:
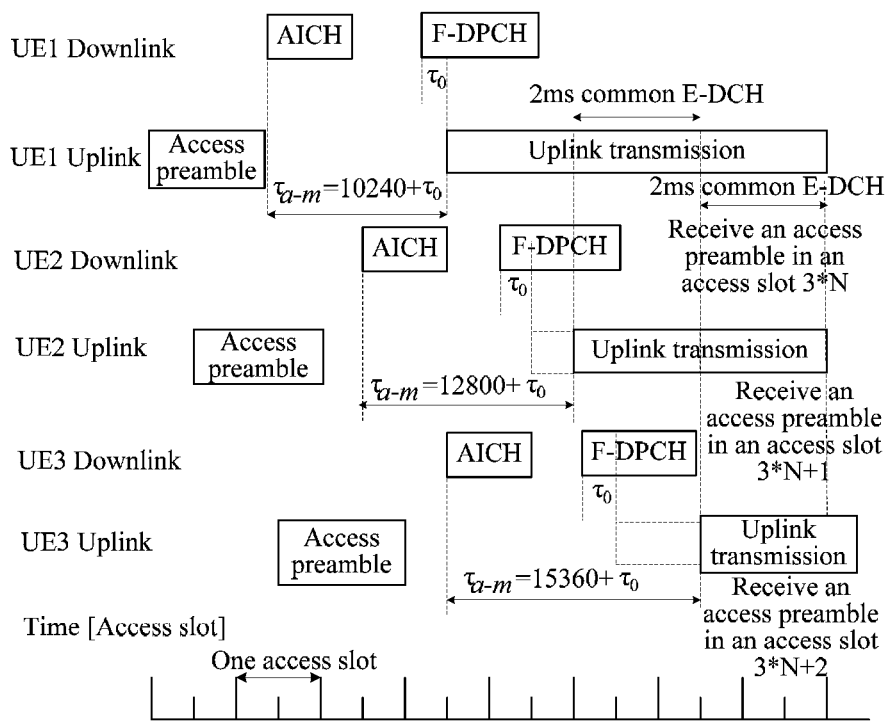
FIG. 2 is a schematic diagram of implementing alignment of uplink data blocks according to a method in an embodiment of the present invention.

FIG. 2 is a schematic diagram of implementing subframe alignment of uplink transmission according to the foregoing examples in an embodiment of the present invention. As shown in FIG. 2, after receiving an ACK that is sent by a NodeB on an AICH, a UE may start to perform uplink transmission, but starting time of the uplink transmission is determined by $\tau_{a-m}$. As described in the foregoing, an access preamble sent by a UE1 to the NodeB is received by the NodeB in an access slot 3N, and after receiving an ACK that is sent by the NodeB on an AICH, the UE1 starts timing from a starting boundary of an AICH access slot, and after delaying $\tau_{a-m}=10240+\tau_0+n_{offset}$, the UE1 starts uplink transmission. An access preamble sent by a UE2 to the NodeB is received by the NodeB in an access slot 3N+1, and after receiving an ACK that is sent by the NodeB on an AICH, the UE2 starts timing from a starting boundary of an AICH access slot, and after delaying $\tau_{a-m}=12800+\tau_0+n_{offset}$, the UE2 starts uplink transmission. Therefore, starting from uplink transmission of an E-DCH of the UE2, a 2 ms E-DCH TTI during which the UE2 performs transmission is aligned with a 2 ms E-DCH TTI during which the UE1 performs transmission. An access preamble sent by a UE3 to the NodeB is received by the NodeB in an access slot 3N+2, and after receiving an ACK that is sent by the NodeB on an AICH, the UE3 starts timing from a starting boundary of an AICH access slot, and after delaying $\tau_{a-m}=15360+\tau_0+n_{offset}$, the UE3 starts uplink transmission. Therefore, starting from uplink transmission of an E-DCH of the UE3, a 2 ms E-DCH TTI during which the UE3 performs transmission is aligned with the 2 ms E-DCH TTI during which the UE2 performs transmission. Therefore, configured resources in the same common E-DCH resource pool can be scheduled for different UEs at the same time, thereby improving a utilization ratio of resources at the same time when obtaining a performance gain of TTI alignment.

According to another alternative solution of the embodiment of the present invention, in a case that the NodeB receives, in an access slot 3N, an access preamble sent by the UE, the UE determines the $\tau_{F-DPCH}$ and the $\tau_{a-m}$ according to the following formulas:

$$\tau_{F-DPCH}=(5120*S_{AI}+15360+n_{offset}) \bmod 38400,$$

$$\tau_{a-m}=15360+\tau_0+n_{offset},$$

where the $S_{AI}$ indicates an AICH access slot number with an AI (AICH access slot # with the AI), which is sent by the NodeB and received by the UE, $\tau_0=1024$ chips, and $n_{offset}$ is the foregoing adjustment offset.

Alternatively, in a case that the NodeB receives, in an access slot 3N+1, an access preamble sent by the UE, the UE determines the $\tau_{F-DPCH}$ and the $\tau_{a-m}$ according to the following formulas:

$$\tau_{F-DPCH}=(5120*S_{AI}+10240+n_{offset}) \bmod 38400,$$

$$\tau_{a-m}=10240+\tau_0+n_{offset},$$

Alternatively, in a case that the NodeB receives, in an access slot 3N+2, an access preamble sent by the UE, the UE determines the $\tau_{F-DPCH}$ and the $\tau_{a-m}$ according to the following formulas:

$$\tau_{F-DPCH}=(5120*S_{AI}+12800+n_{offset}) \bmod 38400,$$

$$\tau_{a-m}=12800+\tau_0+n_{offset},$$

where the $\tau_0$ and the $n_{offset}$ have the same meanings as those described in the foregoing.

Then, according to a slot format of an F-DPCH and the $\tau_{F-DPCH}$, the UE receives, on a F-DPCH channel, a transmit power control (Transportation Power Control, referred to as TPC) command word sent by the NodeB.

Then, after receiving the ACK that is sent by the NodeB on the AICH, the UE starts timing from the starting boundary of the AICH access slot, and after delaying $\tau_{a-m}$, the UE starts to perform uplink transmission to the NodeB. Herein, content of the uplink transmission may include channels such as a DPCCH, an E-DCH, an E-AGCH, an E-RGCH, and an E-HICH. After the uplink transmission is ended, it may be considered that this random access process is ended.

Figure 3:
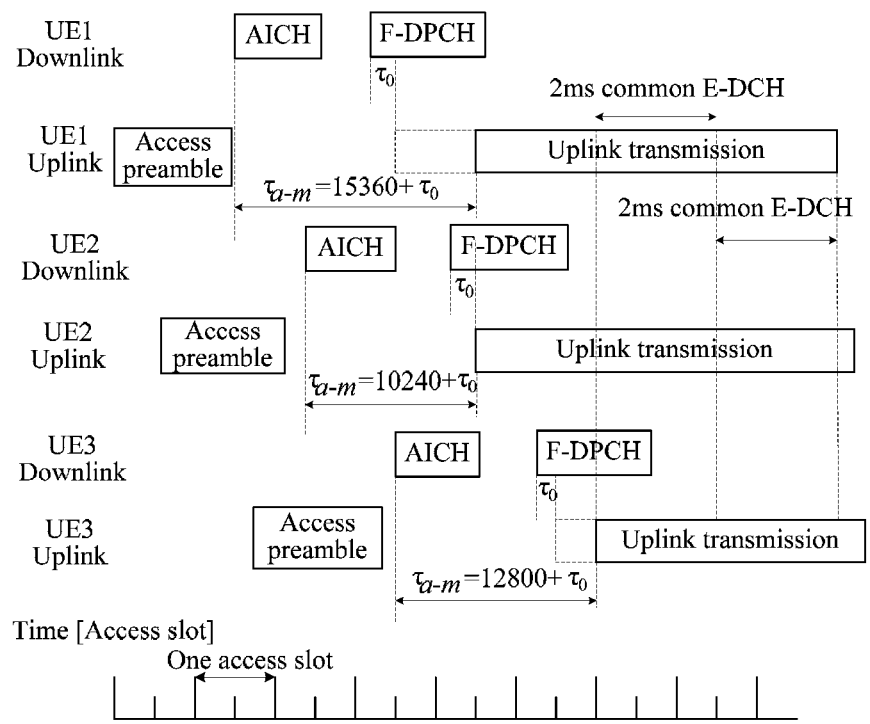
FIG. 3 is a schematic diagram of implementing alignment of uplink data blocks according to a method in an embodiment of the present invention.

FIG. 3 shows a process of implementing uplink transmission of a UE according to the foregoing alternative solution in an embodiment of the present invention. A principle of determining a slot format of an F-DPCH shown in FIG. 3 is the same as that shown in FIG. 2, and a difference lies in that, for different UEs, values of $\tau_{a-m}$ are different. According to a solution shown in FIG. 3, the foregoing technical effects can also be achieved.

According to another alternative solution of the embodiment of the present invention, determining an F-DPCH frame offset $\tau_{F-DPCH}$ of the UE and determining a transmission time interval $\tau_{a-m}$ according to a predefined rule may be:

configuring the $\tau_{F-DPCH}$ to an integral multiple of 2560 chips, where $\tau_{F-DPCH}$ configured by different UEs differs by an integral multiple of 7680 chips; and $$\tau_{a-m}=10240+\tau_0.$$

Figure 4:
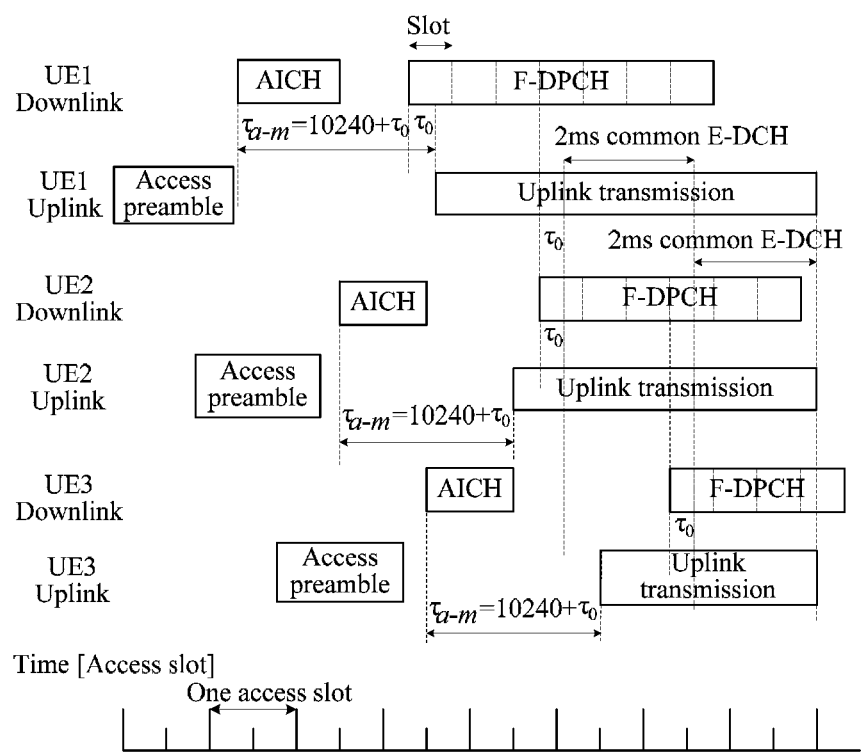
FIG. 4 is a schematic diagram of implementing alignment of uplink data blocks according to a method in an embodiment of the present invention.

It is known that a frame boundary of a downlink F-PDCH may be determined according to the $\tau_{F-DPCH}$, and a frame boundary of uplink transmission delays $\tau_0=1024$ chips relative to the frame boundary of the downlink F-DPCH. Therefore, when $\tau_{F-DPCH}$ of different UEs differs by 7680 chips, namely, a subframe length, uplink frame boundaries of UEs differ by a length of one subframe, that is, uplink subframes of the UEs are aligned. In this case, after receiving an ACK that is sent by a NodeB on an AICH, the UE starts timing from a starting boundary of an AICH access slot, and after delaying the same $\tau_{a-m}=10240+\tau_0$, the UE starts uplink transmission. A position of a subframe boundary of the uplink transmission of the UE may be determined according to the $\tau_{F-DPCH}$. FIG. 4 shows a process of implementing uplink transmission of a UE according to an alternative solution in an embodiment of the present invention. As shown in FIG. 4, an access preamble sent by a UE1 to a NodeB is received by the NodeB in an access slot 3N, and after receiving an ACK that is sent by the NodeB on an AICH, the UE1 starts timing from a starting boundary of an AICH access slot, delays $\tau_{a-m}=10240+\tau_0$, and starts uplink transmission. At this time, content of uplink transmission may include, for example, a physical channel or control signaling for performing a synchronization process. The UE1 determines a subframe boundary of a UE1 E-DCH according to $\tau_{F-DPCH}$ of the UE1. Similarly, an access preamble sent by a UE2 to the NodeB is received by the NodeB in an access slot 3N+1, and after receiving an ACK that is sent by the NodeB on an AICH, the UE2 starts timing from a starting boundary of the AICH access slot, delays $\tau_{a-m}=10240+\tau_0$, and starts uplink transmission. The UE2 determines a subframe boundary of a UE2 E-DCH according to $\tau_{F-DPCH}$ of the UE2. The $\tau_{F-DPCH}$ used by the UE2 and the $\tau_{F-DPCH}$ used by the UE1 differ by an integral multiple of 7680 chips. Therefore, when the UE2 starts uplink transmission of an E-DCH, an E-DCH subframe of the UE2 is aligned with that of the UE1, that is, a 2 ms E-DCH TTI during which the UE2 performs transmission is aligned with a 2 ms E-DCH TTI during which the UE1 performs transmission. Similarly, an E-DCH subframe of the UE3 is aligned with that of the UE2 and that of the UE1, that is, when the UE3 starts uplink transmission of an E-DCH, the 2 ms E-DCH TTI during which the UE3 performs transmission is aligned with the 2 ms E-DCH TTI during which the UE1 performs transmission and the 2 ms E-DCH TTI during which UE2 performs transmission, thereby improving a utilization ratio of resources at the same time obtaining a performance gain of TTI alignment. Here, the UE performs uplink transmission in advance and may use this part of time domain resources to perform a process such as synchronization, which avoids a problem that introducing a TTI alignment technology increases an access delay, and further improves access performance of an uplink resource.

According to another alternative solution of the embodiment of the present invention, a slot format of an F-DPCH used by a UE may also be notified to the UE through a system broadcast message.

In this case, a NodeB sends two sets of system broadcast messages on a cell broadcast channel, and for distinguishing, the two sets of system broadcast messages are referred to as a first system broadcast message and a second system broadcast message respectively. The first system broadcast message is a system broadcast message of a Release 8/9/10 protocol version and carries information such as an F-DPCH symbol offset sent by a NodeB to a UE, and the second system broadcast message carries indication information of a slot format of an F-DPCH used by a UE and determined by a NodeB, for example, a slot format index number of the F-DPCH. A UE of Release 8/9/10 performs uplink transmission according to configuration information of the first system broadcast message, and a UE of Release 11 performs uplink transmission according to configuration information of the second system broadcast message. It should be noted that, UEs of Release 8/9/10/11 all use resources in the same common E-DCH resource pool. Herein it should be noted that, the second system broadcast message may be a part of content added in the first system broadcast message.

In this case, the UE of Release 11 determines $\tau_{F\text{-}DPCH}$ and $\tau_{a\text{-}m}$ used by the UE according to the following formulas:

in a case that the NodeB receives, in an access slot 3N, an access preamble sent by the UE:

$$\tau_{F\text{-}DPCH}=(5120*S_{AI}+10240+n_{offset}) \bmod 38400$$

$$\tau_{a\text{-}m}=10240+\tau_0+n_{offset};$$

or,
in a case that the NodeB receives, in an access slot 3N+1, an access preamble sent by the UE:

$$\tau_{F\text{-}DPCH}=(5120*S_{AI}+12800+n_{offset}) \bmod 38400,$$

$$\tau_{a\text{-}m}=12800+\tau_0+n_{offset};$$

or,
in a case that the NodeB receives, in an access slot 3N+2, an access preamble sent by the UE:

$$\tau_{F\text{-}DPCH}=(5120*S_{AI}+15360+n_{offset}) \bmod 38400$$

$$\tau_{a\text{-}m}=15360+\tau_0+n_{offset},$$

where the $\tau_0$ and the $n_{offset}$ have the same meanings as those described in the foregoing.

Being similar to the process shown in FIG. 4, the UE starts timing when receiving a starting boundary of an AICH access slot sent by the NodeB, and after delaying the $\tau_{a\text{-}m}$, the UE starts uplink transmission. At this time, a content of the uplink transmission may include, for example, a physical channel or control signaling for performing a synchronization process.

By using such a solution, UEs of Release 8/9/10 and Release 11 are enabled to share the same common E-DCH resource pool, so that a utilization ratio of resources is improved, and meanwhile TTI alignment between UEs of Release 11 is implemented, and a performance gain brought by the TTI alignment is obtained.

According to a further alternative solution of the embodiment of the present invention, the UE determines $\tau_{F\text{-}DPCH}$ and $\tau_{a\text{-}m}$ used by the UE according to the following formulas:

in a case that the NodeB receives, in an access slot 3N, an access preamble sent by the UE:

$$\tau_{F\text{-}DPCH}=(5120*S_{AI}+15360+n_{offset}) \bmod 38400,$$

$$\tau_{a\text{-}m}=15360+\tau_0+n_{offset};$$

or,
in a case that the NodeB receives, in an access slot 3N+1, an access preamble sent by the UE:

$$\tau_{F\text{-}DPCH}=(5120*S_{AI}+10240+n_{offset}) \bmod 38400,$$

$$\tau_{a\text{-}m}=10240+\tau_0+n_{offset};$$

or,
in a case that the NodeB receives, in an access slot 3N+2, an access preamble sent by the UE:

$$\tau_{F\text{-}DPCH}=(5120*S_{AI}+12800+n_{offset}) \bmod 38400$$

$$\tau_{a\text{-}m}=12800+\tau_0+n_{offset},$$

where the $\tau_0$ and the $n_{offset}$ have the same meanings as those described in the foregoing.

The foregoing technical effects may also be achieved.

According to a further alternative solution of the embodiment of the present invention, the second system broadcast message may also carry an F-DPCH symbol offset, and the F-DPCH symbol offset may be set to a fixed value, and for example, its value range is 0 to 9. In this case, the UE determines $\tau_{F\text{-}DPCH}$ and $\tau_{a\text{-}m}$ used by the UE according to the following formulas:

in a case that the NodeB receives, in an access slot 3N, an access preamble sent by the UE:

$$\tau_{F\text{-}DPCH}=(5120*S_{AI}+10240+256*S_{offset}+n_{offset}) \bmod 38400,$$

$$\tau_{a\text{-}m}=10240+256*S_{offset}+\tau_0+n_{offset};$$

or,
in a case that the NodeB receives, in an access slot 3N+1, an access preamble sent by the UE:

$$\tau_{F\text{-}DPCH}=(5120*S_{AI}+12800+256*S_{offset}+n_{offset}) \bmod 38400,$$

$$\tau_{a\text{-}m}=12800+256*S_{offset}+\tau_0+n_{offset};$$

or,
in a case that the NodeB receives, in an access slot 3N+2, an access preamble sent by the UE:

$$\tau_{F\text{-}DPCH}=(5120*S_{AI}+15360+256*S_{offset}+n_{offset}) \bmod 38400,$$

$$\tau_{a\text{-}m}=15360+256*S_{offset}\tau_0+n_{offset},$$

where the $\tau_0$ and the $n_{offset}$ have the same meanings as those described in the foregoing.

According to a further alternative solution of the embodiment of the present invention, the UE determines $\tau_{F\text{-}DPCH}$ and $\tau_{a\text{-}m}$ used by the UE according to the following formulas:

in a case that the NodeB receives, in an access slot 3N, an access preamble sent by the UE:

$$\tau_{F\text{-}DPCH}=(5120*S_{AI}+15360+256*S_{offset}+n_{offset}) \bmod 38400,$$

$$\tau_{a\text{-}m}=15360+256*S_{offset}\tau_0+n_{offset};$$

or,
in a case that the NodeB receives, in an access slot 3N+1, an access preamble sent by the UE:

$$\tau_{F\text{-}DPCH}=(5120*S_{AI}+10240+256*S_{offset}+n_{offset}) \bmod 38400,$$

$$\tau_{a\text{-}m}=10240+256*S_{offset}\tau_0+n_{offset};$$

or,
in a case that the NodeB receives, in an access slot 3N+2, an access preamble sent by the UE:

$$\tau_{F\text{-}DPCH}=(5120*S_{AI}+12800+256*S_{offset}+n_{offset}) \bmod 38400,$$

$$\tau_{a\text{-}m}=12800+256*S_{offset}\tau_0+n_{offset},$$

where the $\tau_0$ and the $n_{offset}$ have the same meanings as those described in the foregoing.

The foregoing technical effects may also be achieved.

The technical solutions and the alternative technical solutions of the embodiments of the present invention are described in detail in the foregoing from the perspective of the UE. Accordingly, the same technical solutions are also applicable to the NodeB, so as to implement smooth communication between the NodeB and the UE. The solutions of the embodiments of the present invention are further described in the following from the perspective of the NodeB.

Figure 5:
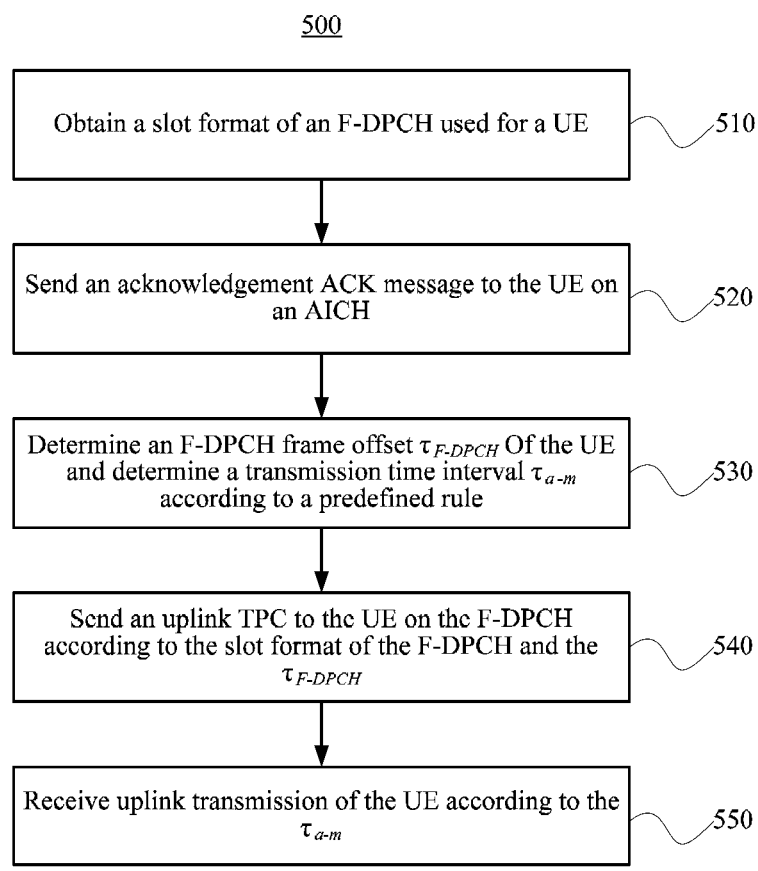
FIG. 5 is a schematic flow chart of a data transmission method according to an embodiment of the present invention.

FIG. 5 is a schematic flow chart of a data transmission method 500 according to an embodiment of the present invention. As shown in FIG. 5, the method 500 includes:

510: Obtain a slot format of an F-DPCH used for a UE.

520: Send an acknowledgement ACK message to the UE on an AICH.

530: Determine an F-DPCH frame offset $\tau_{F\text{-}DPCH}$ of the UE and determine a transmission time interval $\tau_{a\text{-}m}$ according to a predefined rule.

540: Send an uplink TPC to the UE on the F-DPCH according to the slot format of the F-DPCH and the $\tau_{F\text{-}DPCH}$.

550: Receive uplink transmission of the UE according to the $\tau_{a\text{-}m}$.

According to the embodiment of the present invention, the obtaining a slot format of an F-DPCH used for a UE specifically includes:

determining, by the NodeB, common resource configuration information used for the UE, where the common resource configuration information includes information of an F-DPCH symbol offset $S_{offset}$ of the UE; and determining, by the NodeB according to the $S_{offset}$, the slot format of the F-DPCH used for the UE.

According to the embodiment of the present invention, corresponding to the foregoing technical solution of the UE side, the determining an F-DPCH frame offset $\tau_{F\text{-}DPCH}$ of the UE and determining a transmission time interval $\tau_{a\text{-}m}$ according to a predefined rule specifically includes:

in a case that the NodeB receives, in an access slot 3N, an access preamble sent by the UE:

$$\tau_{F\text{-}DPCH}=(5120*S_{AI}+10240+n_{offset})\bmod 38400,$$

$$\tau_{a\text{-}m}=10240+\tau_0+n_{offset};$$

or, in a case that the NodeB receives, in an access slot 3N+1, an access preamble sent by the UE:

$$\tau_{F\text{-}DPCH}=(5120*S_{AI}+12800+n_{offset})\bmod 38400,$$

$$\tau_{a\text{-}m}=12800+\tau_0+n_{offset};$$

or, in a case that the NodeB receives, in an access slot 3N+2, an access preamble sent by the UE:

$$\tau_{F\text{-}DPCH}=(5120*S_{AI}+15360+n_{offset})\bmod 38400,$$

$$\tau_{a\text{-}m}=15360+\tau_0+n_{offset},$$

where the $\tau_0$ and the $n_{offset}$ have the same meanings as those described in the foregoing.

According to another alternative solution of the embodiment of the present invention, in case that the NodeB receives, in an access slot 3N, an access preamble sent by the UE, the $\tau_{F\text{-}DPCH}$ and the $\tau_{a\text{-}m}$ are determined according to the following formulas:

$$\tau_{F\text{-}DPCH}=(5120*S_{AI}+15360+n_{offset})\bmod 38400,$$

$$\tau_{a\text{-}m}=15360+\tau_0+n_{offset};$$

or, in a case that the NodeB receives, in an access slot 3N+1, an access preamble sent by the UE, the $\tau_{F\text{-}DPCH}$ and the $\tau_{a\text{-}m}$ are determined according to the following formulas:

$$\tau_{F\text{-}DPCH}=(5120*S_{AI}+10240+n_{offset})\bmod 38400,$$

$$\tau_{a\text{-}m}=10240+\tau_0+n_{offset};$$

or, in a case that the NodeB receives, in an access slot 3N+2, an access preamble sent by the UE, the $\tau_{F\text{-}DPCH}$ and the $\tau_{a\text{-}m}$ are determined according to the following formulas:

$$\tau_{F\text{-}DPCH}=(5120*S_{AI}+12800+n_{offset})\bmod 38400,$$

$$\tau_{a\text{-}m}=12800+\tau_0+n_{offset},$$

where the $\tau_0$ and the $\tau_{offset}$ have the same meanings as those described in the foregoing.

According to the embodiment of the present invention, corresponding to the foregoing technical solution of the UE side, the determining an F-DPCH frame offset $\tau_{F\text{-}DPCH}$ of the UE and determining a transmission time interval $\tau_{a\text{-}m}$ according to a predefined rule specifically includes:

configuring the $\tau_{F\text{-}DPCH}$ to an integral multiple of 2560 chips, where $\tau_{F\text{-}DPCH}$ configured by different UEs differs by an integral multiple of 7680 chips; and configuring the $\tau_{a\text{-}m}$ to $\tau_{a\text{-}m}=10240+\tau_0$.

According to the embodiment of the present invention, corresponding to the foregoing technical solution of the UE side, the obtaining, by a NodeB, a slot format of an F-DPCH used for a user equipment UE specifically includes:

obtaining, by the NodeB, preset second common resource configuration information used for the UE, where the second common resource configuration information carries slot format information of the F-DPCH used for the UE; and the determining, by the NodeB, an F-DPCH frame offset $\tau_{F\text{-}DPCH}$ of the UE and determining a transmission time interval $\tau_{a\text{-}m}$ according to a predefined rule specifically includes:

in a case that the NodeB receives, in an access slot 3N, an access preamble sent by the UE:

$$\tau_{F\text{-}DPCH}=(5120*S_{AI}+10240+n_{offset})\bmod 38400,$$

$$\tau_{a\text{-}m}=10240+\tau_0+n_{offset};$$

or, in a case that the NodeB receives, in an access slot 3N+1, an access preamble sent by the UE:

$$\tau_{F\text{-}DPCH}=(5120*S_{AI}+12800+n_{offset})\bmod 38400,$$

$$\tau_{a\text{-}m}=12800+\tau_0+n_{offset};$$

or, in a case that the NodeB receives, in an access slot 3N+2, an access preamble sent by the UE:

$$\tau_{F\text{-}DPCH}=(5120*S_{AI}+15360+n_{offset})\bmod 38400,$$

$$\tau_{a\text{-}m}=15360+\tau_0+n_{offset},$$

where the $\tau_0$ and the $n_{offset}$ have the same meanings as those described in the foregoing.

According to a further alternative solution of the embodiment of the present invention, the $\tau_{F\text{-}PCH}$ and the $\tau_{a\text{-}m}$ used by the UE are determined according to the following formulas:

in a case that the NodeB receives, in an access slot 3N, an access preamble sent by the UE:

$\tau_{F-DPCH}=(5120*S_{AI}+15360+n_{offset})\mod 38400$, $\tau_{a-m}=15360+\tau_0+n_{offset}$;

or, in a case that the NodeB receives, in an access slot 3N+1, an access preamble sent by the UE:

$\tau_{F-DPCH}=(5120*S_{AI}+10240+n_{offset})\mod 38400$, $\tau_{a-m}=10240+\tau_0+n_{offset}$;

or, in a case that the NodeB receives, in an access slot 3N+2, an access preamble sent by the UE:

$\tau_{F-DPCH}=(5120*S_{AI}+12800+n_{offset})\mod 38400$, $\tau_{a-m}=12800+\tau_0+n_{offset}$, where the $\tau_0$ and the $n_{offset}$ have the same meanings as those described in the foregoing.

According to the embodiment of the present invention, corresponding to the foregoing technical solution of the UE side, in a case that the second common resource configuration information includes information of an F-DPCH symbol offset $S_{offset}$ used for the UE:

the determining, by the NodeB, an F-DPCH frame offset $\tau_{F-PCH}$ of the UE and determining a transmission time interval $\tau_{a-m}$ according to a predefined rule specifically includes:

in a case that the NodeB receives, in an access slot 3N, an access preamble sent by the UE:

$\tau_{F-DPCH}=(5120*S_{AI}+10240+256*S_{offset}+n_{offset})\mod 38400$, $\tau_{a-m}=10240+256*S_{offset}+\tau_0+n_{offset}$;

or, in a case that the NodeB receives, in an access slot 3N+1, an access preamble sent by the UE:

$\tau_{F-DPCH}=(5120*S_{AI}+12800+256*S_{offset}+n_{offset})\mod 38400$, $\tau_{a-m}=12800+256*S_{offset}+\tau_0+n_{offset}$;

or, in a case that the NodeB receives, in an access slot 3N+2, an access preamble sent by the UE:

$\tau_{F-DPCH}=(5120*S_{AI}+15360+256*S_{offset}+n_{offset})\mod 38400$, $\tau_{a-m}=15360+256*S_{offset}+\tau_0+n_{offset}$, where the $\tau_0$ and the $n_{offset}$ have the same meanings as those described in the foregoing.

According to a further alternative solution of the embodiment of the present invention, the determining, by the NodeB, an F-DPCH frame offset $\tau_{F-DPCH}$ of the UE and determining a transmission time interval $\tau_{a-m}$ according to a predefined rule specifically includes: determining, according to the following formulas, the $\tau_{F-DPCH}$ and the $\tau_{a-m}$ used by the UE:

in a case that the NodeB receives, in an access slot 3N, an access preamble sent by the UE:

$\tau_{F-DPCH}=(5120*S_{AI}+15360+256*S_{offset}+n_{offset})\mod 38400$, $\tau_{a-m}=15360+256*S_{offset}+\tau_0+n_{offset}$;

or, in a case that the NodeB receives, in an access slot 3N+1, an access preamble sent by the UE:

$\tau_{F-DPCH}=(5120*S_{AI}+10240+256*S_{offset}+n_{offset})\mod 38400$, $\tau_{a-m}=10240+256*S_{offset}+\tau_0+n_{offset}$;

or, in a case that the NodeB receives, in an access slot 3N+2, an access preamble sent by the UE:

$\tau_{F-DPCH}=(5120*S_{AI}+12800+256*S_{offset}+n_{offset})\mod 38400$, $\tau_{a-m}=12800+256*S_{offset}+\tau_0+n_{offset}$, where the $\tau_0$ and the $\tau_{offset}$ have the same meanings as those described in the foregoing.

The foregoing technical effects may also be achieved.

According to the embodiment of the present invention, configured resources in the same common E-DCH resource pool can be scheduled for UEs of Release 8/9/10/11 at the same time, thereby improving a utilization ratio of resources at the same time when obtaining a performance gain of TTI alignment.

According to the embodiments of the present invention, a NodeB and a user equipment for implementing the method of the embodiments of the present invention are further shown, which are described in detail in the following separately.

Figure 6:
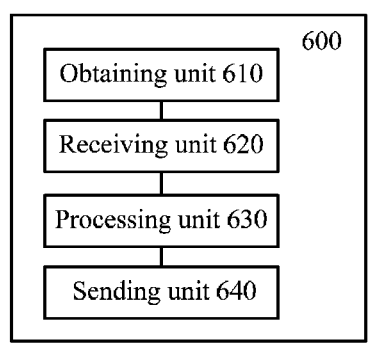
FIG. 6 is a schematic structural diagram of a user equipment according to an embodiment of the present invention.

FIG. 6 is a schematic structural diagram of a user equipment 600 according to an embodiment of the present invention. As shown in FIG. 6, the user equipment 600 includes:

an obtaining unit 610, configured to obtain a slot format of a fractional dedicated physical channel F-DPCH used for the user equipment UE;

a receiving unit 620, configured to receive an acknowledgement ACK message that is sent by a base station on an acquisition indicator channel AICH;

a processing unit 630, configured to determine an F-DPCH frame offset $\tau_{F-DPCH}$ of the UE and determine a transmission time interval $\tau_{a-m}$ according to a predefined rule, where the $\tau_{a-m}$ indicates a time interval between a starting boundary of an access slot when the UE receives the AICH and a time point when the UE starts uplink transmission; where the receiving unit 620 is further configured to receive an uplink power control command word TPC on the F-DPCH according to the slot format of the F-DPCH and the $\tau_{F-DPCH}$; and a sending unit 640, configured to perform uplink transmission to the base station according to the $\tau_{a-m}$.

According to the embodiment of the present invention, the receiving unit 620 is further configured to receive a first common resource configuration message sent by the base station, where the first common resource configuration message carries information of an F-DPCH symbol offset $S_{offset}$ used for the UE; and the obtaining unit 610 is configured to determine the slot format of the F-DPCH according to the $S_{offset}$.

Specifically, the obtaining unit 610 is configured to determine a slot format index number of the F-DPCH, or a first bit offset of the F-DPCH, or a second bit offset of the F-DPCH according to the $S_{offset}$, where the slot format index number of the F-DPCH slot format index=$S_{offset}$, the first bit offset of the F-DPCH $N_{OFF1}=[(S_{offset}+1)*2] \mod 20$, and the second bit offset of the F-DPCH $N_{OFF2}=18-[(S_{offset}+1)*2] \mod 20$; or the obtaining unit is configured to determine a slot format index number of the F-DPCH, or a first bit offset of the F-DPCH, or a second bit offset of the F-DPCH according to the $S_{offset}$ and an adjustment offset $n_{offset}$, where the slot format index number of the F-DPCH $$\text{slot format index} = \left[\left|S_{\textit{offset}} - \frac{n_{\textit{offset}}}{256}\right|\right] \mod 10,$$

the first bit offset of the F-DPCH $$N_{\textit{OFF1}} = \left[\left(\left[\left|S_{\textit{offset}} - \frac{n_{\textit{offset}}}{256}\right|\right] \mod 10 + 1\right) * 2\right] \mod 20,$$

and
the second bit offset of the F-DPCH $$N_{\textit{OFF2}} = 18 - \left[\left(\left[\left|S_{\textit{offset}} - \frac{n_{\textit{offset}}}{256}\right|\right] \mod 10 + 1\right) * 2\right] \mod 20.$$

According to the embodiment of the present invention, the processing unit 630 is configured to determine the F-DPCH frame offset $\tau_{F\text{-}DPCH}$ of the UE and determine the transmission time interval $\tau_{a\text{-}m}$ according to the following formulas:

in a case that the base station receives, in an access slot 3N, an access preamble sent by the UE:

$$\tau_{F\text{-}DPCH} = (5120 * S_{AI} + 10240 + n_{\textit{offset}}) \mod 38400,$$

$$\tau_{a\text{-}m} = 10240 + \tau_0 + n_{\textit{offset}};$$

or,
in a case that the base station receives, in an access slot 3N+1, an access preamble sent by the UE:

$$\tau_{F\text{-}DPCH} = (5120 * S_{AI} + 12800 + n_{\textit{offset}}) \mod 38400,$$

$$\tau_{a\text{-}m} = 12800 + \tau_0 + n_{\textit{offset}};$$

or,
in a case that the base station receives, in an access slot 3N+2, an access preamble sent by the UE:

$$\tau_{F\text{-}DPCH} = (5120 * S_{AI} + 15360 + n_{\textit{offset}}) \mod 38400$$

$$\tau_{a\text{-}m} = 15360 + \tau_0 + n_{\textit{offset}},$$

where the $\tau_0$ and the $n_{\textit{offset}}$ have the same meanings as those described in the foregoing.

According to an alternative solution of the embodiment of the present invention, the processing unit 630 is configured to determine the F-DPCH frame offset $\tau_{F\text{-}DPCH}$ of the UE and determine the transmission time interval $\tau_{a\text{-}m}$ according to the following formulas:

in a case that the base station receives, in an access slot 3N, an access preamble sent by the UE:

$$\tau_{F\text{-}DPCH} = (5120 * S_{AI} + 15360 + n_{\textit{offset}}) \mod 38400,$$

$$\tau_{a\text{-}m} = 15360 + \tau_0 + n_{\textit{offset}};$$

or,
in a case that the base station receives, in an access slot 3N+1, an access preamble sent by the UE:

$$\tau_{F\text{-}DPCH} = (5120 * S_{AI} + 10240 + n_{\textit{offset}}) \mod 38400,$$

$$\tau_{a\text{-}m} = 10240 + \tau_0 + n_{\textit{offset}};$$

or,
in a case that the base station receives, in an access slot 3N+2, an access preamble sent by the UE:

$$\tau_{F\text{-}DPCH} = (5120 * S_{AI} + 12800 + n_{\textit{offset}}) \mod 38400,$$

$$\tau_{a\text{-}m} = 12800 + \tau_0 + n_{\textit{offset}},$$

where the $\tau_0$ and the $n_{\textit{offset}}$ have the same meanings as those described in the foregoing.

According to the embodiment of the present invention, the processing unit 630 is configured to determine the F-DPCH frame offset $\tau_{F\text{-}DPCH}$ of the UE and determine the transmission time interval $\tau_{a\text{-}m}$ according to the following rules:

configuring the $\tau_{F\text{-}DPCH}$ to an integral multiple of 2560 chips, where $\tau_{F\text{-}DPCH}$ configured by different UEs differs by an integral multiple of 7680 chips; and configuring the $\tau_{a\text{-}m}$ to $\tau_{a\text{-}m} = 10240 + \tau_0$, where the $\tau_0$ has the same meaning as that described in the foregoing.

According to the embodiment of the present invention, the receiving unit 620 is configured to receive a second common resource configuration message sent by the base station, where the second common resource configuration message carries slot format information of the F-DPCH used for the UE;

the obtaining unit is configured to determine the F-DPCH frame offset $\tau_{F\text{-}DPCH}$ of the UE and determine the transmission time interval $\tau_{a\text{-}m}$ according to the following formulas:

in a case that the base station receives, in an access slot 3N, an access preamble sent by the UE:

$$\tau_{F\text{-}DPCH} = (5120 * S_{AI} + 10240 + n_{\textit{offset}}) \mod 38400,$$

$$\tau_{a\text{-}m} = 10240 + \tau_0 + n_{\textit{offset}};$$

or,
in a case that the base station receives, in an access slot 3N+1, an access preamble sent by the UE:

$$\tau_{F\text{-}DPCH} = (5120 * S_{AI} + 12800 + n_{\textit{offset}}) \mod 38400,$$

$$\tau_{a\text{-}m} = 12800 + \tau_0 + n_{\textit{offset}};$$

or,
in a case that the base station receives, in an access slot 3N+2, an access preamble sent by the UE:

$$\tau_{F\text{-}DPCH} = (5120 * S_{AI} + 15360 + n_{\textit{offset}}) \mod 38400,$$

$$\tau_{a\text{-}m} = 15360 + \tau_0 + n_{\textit{offset}},$$

where the $\tau_0$ and the $n_{\textit{offset}}$ have the same meanings as those described in the foregoing.

According to an alternative solution of the embodiment of the present invention, the receiving unit 620 is configured to receive a second common resource configuration message sent by the base station, where the second common resource configuration message carries slot format information of the F-DPCH used for the UE;

the obtaining unit is configured to determine the F-DPCH frame offset $\tau_{F\text{-}DPCH}$ of the UE and determine the transmission time interval $\tau_{a\text{-}m}$ according to the following formulas:

in a case that the base station receives, in an access slot 3N, an access preamble sent by the UE:

$$\tau_{F\text{-}DPCH} = (5120 * S_{AI} + 15360 + n_{\textit{offset}}) \mod 38400,$$

$$\tau_{a\text{-}m} = 15360 + \tau_0 + n_{\textit{offset}};$$

or,
in a case that the base station receives, in an access slot 3N+1, an access preamble sent by the UE:

$$\tau_{F\text{-}DPCH} = (5120 * S_{AI} + 10240 + n_{\textit{offset}}) \mod 38400,$$

$$\tau_{a\text{-}m} = 10240 + \tau_0 + n_{\textit{offset}};$$

or,
in a case that the base station receives, in an access slot 3N+2, an access preamble sent by the UE:

$\tau_{F\text{-}DPCH}=(5120*S_{AI}+12800+n_{offset})\bmod 38400,$ $\tau_{a\text{-}m}=12800+\tau_0+n_{offset},$ where the $\tau_0$ and the $n_{offset}$ have the same meanings as those described in the foregoing.

According to the embodiment of the present invention, the receiving unit 620 is configured to receive a second common resource configuration message sent by the base station, where the second common resource configuration message carries slot format information of the F-DPCH used for the UE and information of an F-DPCH symbol offset $S_{offset}$ used for the UE;

the processing unit is configured to determine the F-DPCH frame offset $\tau_{F\text{-}DPCH}$ of the UE and determine the transmission time interval $\tau_{a\text{-}m}$ according to the following formulas:

in a case that the base station receives, in an access slot 3N, an access preamble sent by the UE:

$\tau_{F\text{-}DPCH}=(5120*S_{AI}+10240+256*S_{offset}+n_{offset})\bmod 38400,$ $\tau_{a\text{-}m}=10240+256*S_{offset}+\tau_0+n_{offset};$ or,
in a case that the base station receives, in an access slot 3N+1, an access preamble sent by the UE:

$\tau_{F\text{-}DPCH}=(5120*S_{AI}+12800+256*S_{offset}+n_{offset})\bmod 38400,$ $\tau_{a\text{-}m}=12800+256*S_{offset}+\tau_0+n_{offset};$ or,
in a case that the base station receives, in an access slot 3N+2, an access preamble sent by the UE:

$\tau_{F\text{-}DPCH}=(5120*S_{AI}+15360+256*S_{offset}+n_{offset})\bmod 38400,$ $\tau_{a\text{-}m}=15360+256*S_{offset}+\tau_0+n_{offset},$ where the $\tau_0$ and the $n_{offset}$ have the same meanings as those described in the foregoing.

According to the embodiment of the present invention, the receiving unit 620 is configured to receive a second common resource configuration message sent by the base station, where the second common resource configuration message carries slot format information of the F-DPCH used for the UE and information of an F-DPCH symbol offset $S_{offset}$ used for the UE;

the processing unit is configured to determine the F-DPCH frame offset $\tau_{F\text{-}DPCH}$ of the UE and determine the transmission time interval $\tau_{a\text{-}m}$ according to the following formulas:

in a case that the base station receives, in an access slot 3N, an access preamble sent by the UE:

$\tau_{F\text{-}DPCH}=(5120*S_{AI}+15360+256*S_{offset}+n_{offset})\bmod 38400,$ $\tau_{a\text{-}m}=15360+256*S_{offset}+\tau_0+n_{offset};$ or,
in a case that the base station receives, in an access slot 3N+1, an access preamble sent by the UE:

$\tau_{F\text{-}DPCH}=(5120*S_{AI}+10240+256*S_{offset}+n_{offset})\bmod 38400,$ $\tau_{a\text{-}m}=10240+256*S_{offset}+\tau_0+n_{offset};$ or,
in a case that the base station receives, in an access slot 3N+2, an access preamble sent by the UE:

$\tau_{F\text{-}DPCH}=(5120*S_{AI}+12800+256*S_{offset}+n_{offset})\bmod 38400,$ $\tau_{a\text{-}m}=12800+256*S_{offset}\tau_0+n_{offset},$ where the $\tau_0$ and the $n_{offset}$ have the same meanings as those described in the foregoing.

Figure 7:
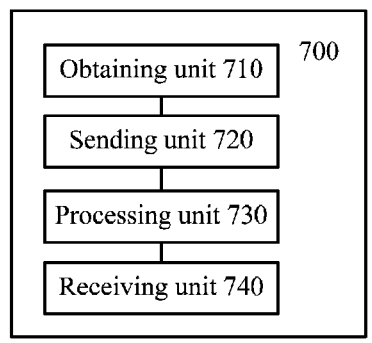
FIG. 7 is a schematic structural diagram of a base station according to an embodiment of the present invention.

FIG. 7 is a schematic structural diagram of a base station 700 according to an embodiment of the present invention. As shown in FIG. 7, the base station 700 includes:

an obtaining unit 710, configured to obtain a slot format of a fractional dedicated physical channel F-DPCH used for a user equipment UE;

a sending unit 720, configured to send an acknowledgement ACK message to the UE on an acquisition indicator channel AICH;

a processing unit 730, configured to determine an F-DPCH frame offset $\tau_{F\text{-}DPCH}$ of the UE and determine a transmission time interval $\tau_{a\text{-}m}$ according to a predefined rule, where the $\tau_{a\text{-}m}$ indicates a time interval between a starting boundary of an access slot when the UE receives the AICH and a time point when the UE starts uplink transmission; where the sending unit 720 is further configured to send an uplink power control command word TPC to the UE on the F-DPCH according to the slot format of the F-DPCH and the $\tau_{F\text{-}DPCH}$; and a receiving unit 740, configured to receive uplink transmission of the UE according to the $\tau_{a\text{-}m}$.

According to the embodiment of the present invention, the obtaining unit 710 is configured to determine common resource configuration information used for the UE, where the common resource configuration information includes information of an F-DPCH symbol offset $S_{offset}$ used for the UE, and the obtaining unit 710 is configured to determine, according to the $S_{offset}$, the slot format of the F-DPCH used for the UE.

The obtaining unit 710 is configured to determine a slot format index number of the F-DPCH, or a first bit offset of the F-DPCH, or a second bit offset of the F-DPCH according to the $S_{offset}$, where the slot format index number of the F-DPCH slot format index=$S_{offset}$, the first bit offset of the F-DPCH $N_{OFF1}=[(S_{offset}+1)*2]\bmod 20$, and the second bit offset of the F-DPCH $N_{OFF2}=18-[(S_{offset}+1)*2]\bmod 20$; or the obtaining unit is configured to determine a slot format index number of the F-DPCH, or a first bit offset of the F-DPCH, or a second bit offset of the F-DPCH according to the $S_{offset}$ and an adjustment offset $n_{offset}$, where the slot format index number of the F-DPCH $$\text{slot format index}=\left[\left|S_{offset}-\frac{n_{offset}}{256}\right|\right]\bmod 10,$$

the first bit offset of the F-DPCH $$N_{OFF1}=\left[\left(\left|S_{offset}-\frac{n_{offset}}{256}\right|\bmod 10+1\right)*2\right]\bmod 20,$$

and
the second bit offset of the F-DPCH $$N_{OFF2}=18-\left[\left(\left|S_{offset}-\frac{n_{offset}}{256}\right|\bmod 10+1\right)*2\right]\bmod 20.$$

According to the embodiment of the present invention, the processing unit 730 is configured to determine the F-DPCH frame offset $\tau_{F\text{-}DPCH}$ of the UE and determine the transmission time interval $\tau_{a\text{-}m}$ according to the following formulas:

in a case that the base station receives, in an access slot 3N, an access preamble sent by the UE:

$$\tau_{F\text{-}DPCH}=(5120*S_{AI}+10240+n_{offset}) \bmod 38400,$$

$$\tau_{a\text{-}m}=10240+\tau_0+n_{offset};$$

or, in a case that the base station receives, in an access slot 3N+1, an access preamble sent by the UE:

$$\tau_{F\text{-}DPCH}=(5120*S_{AI}+12800+n_{offset}) \bmod 38400,$$

$$\tau_{a\text{-}m}=12800+\tau_0+n_{offset};$$

or, in a case that the base station receives, in an access slot 3N+2, an access preamble sent by the UE:

$$\tau_{F\text{-}DPCH}=(5120*S_{AI}+15360+n_{offset}) \bmod 38400,$$

$$\tau_{a\text{-}m}=15360+\tau_0+n_{offset},$$

where, the $\tau_0$ and the $n_{offset}$ have the same meanings as those described in the foregoing.

According to the embodiment of the present invention, the processing unit 730 is configured to determine the F-DPCH frame offset $\tau_{F\text{-}DPCH}$ of the UE and determine the transmission time interval $\tau_{a\text{-}m}$ according to the following formulas:

in a case that the base station receives, in an access slot 3N, an access preamble sent by the UE:

$$\tau_{F\text{-}DPCH}=(5120*S_{AI}+15360+n_{offset}) \bmod 38400,$$

$$\tau_{a\text{-}m}=15360+\tau_0+n_{offset};$$

or, in a case that the base station receives, in an access slot 3N+1, an access preamble sent by the UE:

$$\tau_{F\text{-}DPCH}=(5120*S_{AI}+10240+n_{offset}) \bmod 38400,$$

$$\tau_{a\text{-}m}=10240+\tau_0+n_{offset};$$

or, in a case that the base station receives, in an access slot 3N+2, an access preamble sent by the UE:

$$\tau_{F\text{-}DPCH}=(5120*S_{AI}+12800+n_{offset}) \bmod 38400,$$

$$\tau_{a\text{-}m}=12800+\tau_0+n_{offset},$$

where the $\tau_0$ and the $n_{offset}$ have the same meanings as those described in the foregoing.

According to the embodiment of the present invention, the processing unit 730 is configured to determine the F-DPCH frame offset $\tau_{F\text{-}DPCH}$ of the UE and determine the transmission time interval $\tau_{a\text{-}m}$ according to the following rules:

configuring the $\tau_{F\text{-}DPCH}$ to an integral multiple of 2560 chips, where $\tau_{F\text{-}DPCH}$ configured by different UEs differs by an integral multiple of 7680 chips; and configuring the $\tau_{a\text{-}m}$ to $\tau_{a\text{-}m}=10240+\tau_0$, where the $\tau_0$ has the same meaning as that described in the foregoing.

According to the embodiment of the present invention, the obtaining unit 710 is configured to obtain preset second common resource configuration information used for the UE, where the second common resource configuration information carries slot format information of the F-DPCH used for the UE; and the processing unit 730 is configured to determine the F-DPCH frame offset $\tau_{F\text{-}DPCH}$ of the UE and determine the transmission time interval $\tau_{a\text{-}m}$ according to the following formulas:

in a case that the base station receives, in an access slot 3N, an access preamble sent by the UE:

$$\tau_{F\text{-}DPCH}=(5120*S_{AI}+10240+n_{offset}) \bmod 38400,$$

$$\tau_{a\text{-}m}=10240+\tau_0+n_{offset};$$

or, in a case that the base station receives, in an access slot 3N+1, an access preamble sent by the UE:

$$\tau_{F\text{-}DPCH}=(5120*S_{AI}+12800+n_{offset}) \bmod 38400,$$

$$\tau_{a\text{-}m}=12800+\tau_0+n_{offset};$$

or, in a case that the base station receives, in an access slot 3N+2, an access preamble sent by the UE:

$$\tau_{F\text{-}DPCH}=(5120*S_{AI}+15360+n_{offset}) \bmod 38400,$$

$$\tau_{a\text{-}m}=15360+\tau_0+n_{offset},$$

where the $\tau_0$ and the $n_{offset}$ have the same meanings as those described in the foregoing.

According to the embodiment of the present invention, the obtaining unit 710 is configured to obtain preset second common resource configuration information used for the UE, where the second common resource configuration information carries slot format information of the F-DPCH used for the UE; and the processing unit 730 is configured to determine the F-DPCH frame offset $\tau_{F\text{-}DPCH}$ of the UE and determine the transmission time interval $\tau_{a\text{-}m}$ according to the following formulas:

in a case that the base station receives, in an access slot 3N, an access preamble sent by the UE:

$$\tau_{F\text{-}DPCH}=(5120*S_{AI}+15360+n_{offset}) \bmod 38400,$$

$$\tau_{a\text{-}m}=15360+\tau_0+n_{offset};$$

or, in a case that the base station receives, in an access slot 3N+1, an access preamble sent by the UE:

$$\tau_{F\text{-}DPCH}=(5120*S_{AI}+10240+n_{offset}) \bmod 38400,$$

$$\tau_{a\text{-}m}=10240+\tau_0+n_{offset};$$

or, in a case that the base station receives, in an access slot 3N+2, an access preamble sent by the UE:

$$\tau_{F\text{-}DPCH}=(5120*S_{AI}+12800+n_{offset}) \bmod 38400,$$

$$\tau_{a\text{-}m}=12800+\tau_0+n_{offset},$$

where the $\tau_0$ and the $n_{offset}$ have the same meanings as those described in the foregoing.

According to the embodiment of the present invention, the obtaining unit 710 is configured to obtain preset second common resource configuration information used for the UE, where the second common resource configuration information includes slot format information of the F-DPCH used for the UE and information of an F-DPCH symbol offset $S_{offset}$ used for the UE; and the processing unit 730 is configured to determine the F-DPCH frame offset $\tau_{F\text{-}DPCH}$ of the UE and determine the transmission time interval $\tau_{a\text{-}m}$ according to the following formulas:

in a case that the base station receives, in an access slot 3N, an access preamble sent by the UE:

$$\tau_{F\text{-}DPCH}=(5120*S_{AI}+10240+256*S_{offset}+n_{offset})\mod 38400,$$

$$\tau_{a\text{-}m}=10240+256*S_{offset}\tau_0+n_{offset};$$

or, in a case that the base station receives, in an access slot 3N+1, an access preamble sent by the UE:

$$\tau_{F\text{-}DPCH}=(5120*S_{AI}+12800+256*S_{offset}+n_{offset})\mod 38400,$$

$$\tau_{a\text{-}m}=12800+256*S_{offset}\tau_0+n_{offset};$$

or, in a case that the base station receives, in an access slot 3N+2, an access preamble sent by the UE:

$$\tau_{F\text{-}DPCH}=(5120*S_{AI}+15360+256*S_{offset}+n_{offset})\mod 38400,$$

$$\tau_{a\text{-}m}=15360+256*S_{offset}\tau_0+n_{offset},$$

where the $\tau_0$ and the $n_{offset}$ have the same meanings as those described in the foregoing.

According to the embodiment of the present invention, the obtaining unit 710 is configured to obtain preset second common resource configuration information used for the UE, where the second common resource configuration information includes slot format information of the F-DPCH used for the UE and information of an F-DPCH symbol offset $S_{offset}$ used for the UE; and the processing unit 730 is configured to determine the F-DPCH frame offset $\tau_{F\text{-}DPCH}$ of the UE and determine the transmission time interval $\tau_{a\text{-}m}$ according to the following formulas:

in a case that the base station receives, in an access slot 3N, an access preamble sent by the UE:

$$\tau_{F\text{-}DPCH}=(5120*S_{AI}+15360+256*S_{offset}+n_{offset})\mod 38400,$$

$$\tau_{a\text{-}m}=15360+256*S_{offset}\tau_0+n_{offset};$$

or, in a case that the base station receives, in an access slot 3N+1, an access preamble sent by the UE:

$$\tau_{F\text{-}DPCH}=(5120*S_{AI}+10240+256*S_{offset}+n_{offset})\mod 38400,$$

$$\tau_{a\text{-}m}=10240+256*S_{offset}\tau_0+n_{offset};$$

or, in a case that the base station receives, in an access slot 3N+2, an access preamble sent by the UE:

$$\tau_{F\text{-}DPCH}=(5120*S_{AI}+12800+256*S_{offset}+n_{offset})\mod 38400,$$

$$\tau_{a\text{-}m}=12800+256*S_{offset}\tau_0+n_{offset},$$

where the $\tau_0$ and the $n_{offset}$ have the same meanings as those described in the foregoing.

Persons of ordinary skill in the art may be aware that, in combination with the examples described in the embodiments disclosed in this specification, units and algorithm steps may be implemented by electronic hardware, or a combination of computer software and electronic hardware. Whether these functions are performed by hardware or software depends on particular applications and design constraint conditions of the technical solutions. Persons skilled in the art may use different methods to implement the described functions for each particular application, but it should not be considered that such implementation goes beyond the scope of the present invention.

It may be clearly understood by persons skilled in the art that, for the purpose of convenient and brief description, for a detailed working process of the foregoing system, apparatus, and unit, reference may be made to a corresponding process in the foregoing method embodiments, which is not described herein again.

In the several embodiments provided in the present application, it should be understood that the disclosed system, apparatus, and method may be implemented in other manners. For example, the apparatus embodiments described in the foregoing are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or part of the technical solutions may be implemented in the form of a software product. The computer software product is stored in a storage medium, which includes several instructions for instructing a computer device (which may be a personal computer, a server, or a network device) to perform all or a part of the steps of the method described in the embodiments of the present invention. The foregoing storage medium includes: any medium that can store program codes, such as a USB flash disk, a removable hard disk, a read-only memory (ROM, Read-Only Memory), a random access memory (RAM, Random Access Memory), a magnetic disk, or an optical disk.

The foregoing descriptions are merely specific embodiments of the present invention, but are not intended to limit the protection scope of the present invention. Any variation or replacement readily figured out by persons skilled in the art within the technical scope disclosed in the present invention shall all fall within the protection scope of the present invention. Therefore, the protection scope of the present invention shall be subject to the protection scope of the claims.

What is claimed is:

1. A data transmission method, comprising:
   obtaining a slot format of a fractional dedicated physical channel (F-DPCH) used for a user equipment (UE);
   receiving an acknowledgement (ACK) message that is sent by a base station on an acquisition indicator channel (AICH);

determining an F-DPCH frame offset $\tau_{F\text{-}DPCH}$ of the UE and determining a transmission time interval $\tau_{a\text{-}m}$ according to a predefined rule, wherein the $\tau_{a\text{-}m}$ indicates a time interval between a starting boundary of an access slot when the UE receives the AICH and a time point when the UE starts uplink transmission;

receiving an uplink power control command (TPC) word on the F-DPCH according to the slot format of the F-DPCH and the $\tau_{F\text{-}DPCH}$; and performing the uplink transmission to the base station according to the $\tau_{a\text{-}m}$;

wherein the obtaining the slot format of the F-DPCH used for the UE comprises:

receiving first common resource configuration information sent by the base station, wherein the first common resource configuration information carries information of an F-DPCH symbol offset $S_{offset}$ used for the UE; and determining the slot format of the F-DPCH according to the $S_{offset}$;

wherein the determining the F-DPCH frame offset $\tau_{F\text{-}DPCH}$ of the UE and determining the transmission time interval $\tau_{a\text{-}m}$ according to the predefined rule comprises one of the following:

(a) when the UE sends an access preamble to the base station in an access slot 3N:

$\tau_{F\text{-}DPCH}=(5120*S_{AI}+10240+n_{offset})\bmod 38400$, $\tau_{a\text{-}m}=10240+\tau_0+n_{offset}$;

(b) when the UE sends an access preamble to the base station in an access slot 3N+1:

$\tau_{F\text{-}DPCH}=(5120*S_{AI}+12800+n_{offset})\bmod 38400$ $\tau_{a\text{-}m}=12800+\tau_0+n_{offset}$;

and, (c) when the UE sends an access preamble to the base station in an access slot 3N+2:

$\tau_{F\text{-}DPCH}=(5120*S_{AI}+15360+n_{offset})\bmod 38400$ $\tau_{a\text{-}m}=15360+\tau_0+n_{offset}$, wherein the $S_{AI}$ indicates a received AICH access slot number with an acquisition indicator AI, which is sent by the base station, $\tau_0=1024$ chips, and the $n_{offset}$ is an integral multiple of 256 chips.

2. The method according to claim 1, wherein, the determining the slot format of the F-DPCH according to the $S_{offset}$ comprises:

determining one of the following: (a) a slot format index number of the F-DPCH, (b) a first bit offset of the F-DPCH, and (c) a second bit offset of the F-DPCH, according to the $S_{offset}$.

3. The method according to claim 1, wherein the determining the slot format of the F-DPCH according to the $S_{offset}$ comprises:

determining one of the following: (a) a slot format index number of the F-DPCH, (b) a first bit offset of the F-DPCH, and (c) a second bit offset of the F-DPCH, according to the $S_{offset}$, and an adjustment offset $n_{offset}$ that is configured or predefined by a higher layer, wherein the $n_{offset}$ is an integral multiple of 256 chips.

4. The method according to claim 3, wherein the determining one of the slot format index number of the F-DPCH, first bit offset of the F-DPCH, and the second bit offset of the F-DPCH according to the $S_{offset}$, and an adjustment offset $n_{offset}$ comprises:

the slot format index number of the F-DPCH $$\text{slot format index} = \left[\left|S_{offset} - \frac{n_{offset}}{256}\right|\right]\bmod 10,$$

the first bit offset of the F-DPCH $$N_{OFF1} = \left[\left(\left[\left|S_{offset} - \frac{n_{offset}}{256}\right|\right]\bmod 10 + 1\right)*2\right]\bmod 20,$$

and
the second bit offset of the F-DPCH $$N_{OFF2} = 18 - \left[\left(\left[\left|S_{offset} - \frac{n_{offset}}{256}\right|\right]\bmod 10 + 1\right)*2\right]\bmod 20.$$

5. A data transmission method, comprising:

obtaining a slot format of a fractional dedicated physical channel (F-DPCH) used for a user equipment (UE);

sending an acknowledgement (ACK) message to the UE on an acquisition indicator channel (AICH);

determining an F-DPCH frame offset $\tau_{F\text{-}DPCH}$ of the UE and determining a transmission time interval $\tau_{a\text{-}m}$ according to a predefined rule, wherein the $\tau_{a\text{-}m}$ indicates a time interval between a starting boundary of an access slot when the UE receives the AICH and a time point when the UE starts uplink transmission;

sending an uplink power control command (TPC) word to the UE on the F-DPCH according to the slot format of the F-DPCH and the $\tau_{F\text{-}DPCH}$; and receiving the uplink transmission of the UE according to the $\tau_{a\text{-}m}$;

wherein the obtaining the slot format of the F-DPCH used for the UE comprises:

determining first common resource configuration information used for the UE, wherein the first common resource configuration information comprises information of an F-DPCH symbol offset $S_{offset}$ used for the UE; and determining, according to the $S_{offset}$, the slot format of the F-DPCH used for the UE;

wherein the determining the F-DPCH frame offset $\tau_{F\text{-}DPCH}$ of the UE and determining the transmission time interval $\tau_{a\text{-}m}$ according to the predefined rule comprises one of the following:

(a) when the base station receives, in an access slot 3N, an access preamble sent by the UE:

$\tau_{F\text{-}DPCH}=(5120*S_{AI}+10240+n_{offset})\bmod 38400$, $\tau_{a\text{-}m}=10240+\tau_0+n_{offset}$;

(b) when the base station receives, in an access slot 3N+1, an access preamble sent by the UE:

$\tau_{F\text{-}DPCH}(5120*S_{AI}+12800+n_{offset})\bmod 38400$ $\tau_{a\text{-}m}=12800+\tau_0+n_{offset}$;

and (c) when the base station receives, in an access slot 3N+2, an access preamble sent by the UE:

$\tau_{F\text{-}DPCH}=(5120*S_{AI}+15360+n_{offset})\bmod 38400$, $\tau_{a\text{-}m}=15360+\tau_0+n_{offset}$, wherein the $S_{AI}$ indicates a received AICH access slot number with an acquisition indicator AI, which is sent by the base station, $\tau_0=1024$ chips, and the $n_{offset}$ is an integral multiple of 256 chips.

6. The method according to claim 5, wherein,
the determining the slot format of the F-DPCH according to the $S_{offset}$ comprises:
determining one of the following: (a) a slot format index number of the F-DPCH, (b) a first bit offset of the F-DPCH, and (c) a second bit offset of the F-DPCH according to the $S_{offset}$.

7. The method according to claim 5, wherein the determining the slot format of the F-DPCH according to the $S_{offset}$ comprises:
determining one of the following: (a) a slot format index number of the F-DPCH, (b) a first bit offset of the F-DPCH, and (c) a second bit offset of the F-DPCH according to the $S_{offset}$, and an adjustment offset $n_{offset}$ that is configured or predefined by a higher layer, wherein the $n_{offset}$ is an integral multiple of 256 chips.

8. The method according to claim 7, wherein the determining one of the slot format index number of the F-DPCH, the first bit offset of the F-DPCH, and the second bit offset of the F-DPCH according to the $S_{offset}$, and an adjustment offset $n_{offset}$ comprises:
the slot format index number of the F-DPCH $$\text{slot format index} = \left[\left|S_{offset} - \frac{n_{offset}}{256}\right|\right] \bmod 10,$$

the first bit offset of the F-DPCH $$N_{OFF1} = \left[\left(\left|\left|S_{offset} - \frac{n_{offset}}{256}\right|\right| \bmod 10 + 1\right) * 2\right] \bmod 20,$$

and
the second bit offset of the F-DPCH $$N_{OFF2} = 18 - \left[\left(\left|\left|S_{offset} - \frac{n_{offset}}{256}\right|\right| \bmod 10 + 1\right) * 2\right] \bmod 20.$$

9. A user equipment, comprising:
a processor, configured to obtain a slot format of a fractional dedicated physical channel (F-DPCH) used for the user equipment (UE);
a receiver, configured to receive an acknowledgement (ACK) message that is sent by a base station on an acquisition indicator channel (AICH);
wherein the processor is further configured to determine an F-DPCH frame offset $\tau_{F\text{-}DPCH}$ of the UE and determine a transmission time interval $\tau_{a\text{-}m}$ according to a predefined rule, wherein the $\tau_{a\text{-}m}$ indicates a time interval between a starting boundary of an access slot when the UE receives the AICH and a time point when the UE starts uplink transmission; and
the receiver is further configured to receive an uplink power control command (TPC) word on the F-DPCH according to the slot format of the F-DPCH and the $\tau_{F\text{-}DPCH}$;
a transmitter, configured to perform the uplink transmission to the base station according to the $\tau_{a\text{-}m}$;
wherein the receiver is further configured to receive first common resource configuration information sent by the base station, the first common resource configuration information carries information of an F-DPCH symbol offset $S_{offset}$ used for the UE;

the processor is configured to determine the slot format of the F-DPCH according to the $S_{offset}$;
the processor is configured to determine the F-DPCH frame offset $\tau_{F\text{-}DPCH}$ of the UE and determine the transmission time interval $\tau_{a\text{-}m}$ according to one of the following formulas:
(a) when the UE sends an access preamble to the base station in an access slot 3N:

$$\tau_{F\text{-}DPCH} = (5120 * S_{AI} + 10240 + n_{offset}) \bmod 38400,$$

$$\tau_{a\text{-}m} = 10240 + \tau_0 + n_{offset};$$

(b) when the UE sends an access preamble to the base station in an access slot 3N+1:

$$\tau_{F\text{-}DPCH} = (5120 * S_{AI} + 12800 + n_{offset}) \bmod 38400,$$

$$\tau_{a\text{-}m} = 12800 + \tau_0 + n_{offset};$$

and,
(c) when the UE sends an access preamble to the base station in an access slot 3N+2:

$$\tau_{F\text{-}DPCH} = (5120 * S_{AI} + 15360 + n_{offset}) \bmod 38400,$$

$$\tau_{a\text{-}m} = 15360 + \tau_0 + n_{offset},$$

wherein the $S_{AI}$ indicates a received AICH access slot number with an acquisition indicator AI, which is sent by the base station, $\tau_0 = 1024$ chips, and the $n_{offset}$ is an integral multiple of 256 chips.

10. The user equipment according to claim 9, wherein,
the processor is configured to determine a slot format index number of the F-DPCH.

11. The user equipment according to claim 9, wherein the processor is configured to determine one of the following: (a) a slot format index number of the F-DPCH, (b) a first bit offset of the F-DPCH, and (c) a second bit offset of the F-DPCH, according to the $S_{offset}$, and an adjustment offset $\tau_{offset}$, wherein the slot format index number of the F-DPCH $$\text{slot format index} = \left[\left|S_{offset} - \frac{n_{offset}}{256}\right|\right] \bmod 10,$$

the first bit offset of the F-DPCH $$N_{OFF1} = \left[\left(\left|\left|S_{offset} - \frac{n_{offset}}{256}\right|\right| \bmod 10 + 1\right) * 2\right] \bmod 20,$$

and
the second bit offset of the F-DPCH $$N_{OFF2} = 18 - \left[\left(\left|\left|S_{offset} - \frac{n_{offset}}{256}\right|\right| \bmod 10 + 1\right) * 2\right] \bmod 20.$$

12. A base station comprising:
a processor, configured to obtain a slot format of a fractional dedicated physical channel (F-DPCH) used for a user equipment (UE);
a transmitter, configured to send an acknowledgement (ACK) message to the UE on an acquisition indicator channel (AICH);
wherein the processor is further configured to determine an F-DPCH frame offset $\tau_{F\text{-}DPCH}$ of the UE and determine a transmission time interval $\tau_{a-m}$ according to a predefined rule, wherein the $\tau_{a-m}$ indicates a time interval between a time when the UE receives the AICH and a time point when the UE starts uplink transmission; and the transmitter is further configured to send an uplink power control command (TPC) word to the UE on the F-DPCH according to the slot format of the F-DPCH and the $\tau_{F-DPCH}$;

a receiver, configured to receive uplink transmission of the UE according to the $\tau_{a-m}$;

wherein the processor is configured to determine common resource configuration information used for the UE, the common resource configuration information comprises information of an F-DPCH symbol offset $S_{offset}$ used for the UE, and determine, according to the $S_{offset}$, the slot format of the F-DPCH used for the UE;

the processor is configured to determine the F-DPCH frame offset $\tau_{F-DPCH}$ of the UE and determine the transmission time interval $\tau_{a-m}$ according to one of the following formulas:

(a) when the base station receives, in an access slot 3N, an access preamble sent by the UE:

$\tau_{F-DPCH}=(5120*S_{AI}+10240+n_{offset})\bmod 38400$, $\tau_{a-m}=10240+\tau_0+n_{offset}$;

(b) when the base station receives, in an access slot 3N+1, an access preamble sent by the UE:

$\tau_{F-DPCH}=(5120*S_{AI}+12800+n_{offset})\bmod 38400$, $\tau_{a-m}=12800+\tau_0+n_{offset}$;

and, (c) when the base station receives, in an access slot 3N+2, an access preamble sent by the UE:

$\tau_{F-DPCH}=(5120*S_{AI}+15360+n_{offset})\bmod 38400$, $\tau_{a-m}=15360+\tau_0+n_{offset}$;

wherein the $S_{AI}$ indicates a received AICH access slot number with an acquisition indicator AI, which is sent by the base station, $\tau_0=1024$ chips, and the $n_{offset}$ is an integral multiple of 256 chips.

13. The base station according to claim 12, wherein, the processor is configured to determine a slot format index number of the F-DPCH.

14. The base station according to claim 12, wherein the processor is configured to determine one of the following: (a) a slot format index number of the F-DPCH, (b) a first bit offset of the F-DPCH, and (c) a second bit offset of the F-DPCH, according to the $S_{offset}$, and an adjustment offset $n_{offset}$, wherein the slot format index number of the F-DPCH $$\text{slot format index} = \left[\left|S_{offset} - \frac{n_{offset}}{256}\right|\right]\bmod 10,$$

the first bit offset of the F-DPCH $$N_{OFF1} = \left[\left(\left[\left|S_{offset} - \frac{n_{offset}}{256}\right|\right]\bmod 10 + 1\right)*2\right]\bmod 20,$$

and
the second bit offset of the F-DPCH $$N_{OFF2} = 18 - \left[\left(\left[\left|S_{offset} - \frac{n_{offset}}{256}\right|\right]\bmod 10 + 1\right)*2\right]\bmod 20.$$

* * * * *

UNITED STATES PATENT AND TRADEMARK OFFICE
CERTIFICATE OF CORRECTION

PATENT NO.       : 9,338,797 B2                                    Page 1 of 1
APPLICATION NO.  : 14/302013
DATED            : May 10, 2016
INVENTOR(S)      : Shao et al.

It is certified that error appears in the above-identified patent and that said Letters Patent is hereby corrected as shown below:

Title page, item (73), Assignee, "Shenzhen (CK)" should read -- Shenzhen (CN) --.

Signed and Sealed this
Twenty-sixth Day of July, 2016

Michelle K. Lee
*Director of the United States Patent and Trademark Office*